United States Patent [19]

Van Holten

[11] 4,093,402
[45] June 6, 1978

[54] PROPELLER OR A SET OF WINGS FOR A WIND MILL

[76] Inventor: Theodoor Van Holten, Thorbeckelaan 66, Pijnacker, Netherlands

[21] Appl. No.: 740,090

[22] Filed: Nov. 9, 1976

[51] Int. Cl.² ............................................. F03D 1/06
[52] U.S. Cl. ................................. 416/236 A; 416/191
[58] Field of Search ................... 416/191, 236, 236 A

[56] References Cited

U.S. PATENT DOCUMENTS

| 2,361,676 | 10/1944 | Baker | 416/236 A |
| 3,527,544 | 9/1970 | Allen | 416/191 X |

FOREIGN PATENT DOCUMENTS

| 386,866 | 12/1923 | Germany | 416/236 A |
| 638,173 | 11/1936 | Germany | 416/191 |
| 814,713 | 9/1951 | Germany | 416/236 A |
| 899,180 | 12/1953 | Germany | 416/236 A |
| 1,097,285 | 1/1961 | Germany | 416/236 A |
| 458,809 | 8/1950 | Italy | 416/236 A |

Primary Examiner—Everette A. Powell, Jr.
Attorney, Agent, or Firm—Paul & Paul

[57] ABSTRACT

A propeller for a wind mill comprising a rotable supported hub with at least one mainly radially extending blade having a cross section in the shape of a "wing profile", each blade being provided with at least one auxiliary blade with a cross section in the shape of wing profile and being positioned such that said auxiliary blade will generate a "ventury effect" by which a part of the fluid, which normally should pass outside the propeller disc area, is drawn into the propeller.

7 Claims, 7 Drawing Figures

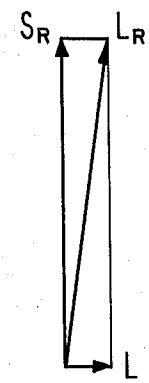
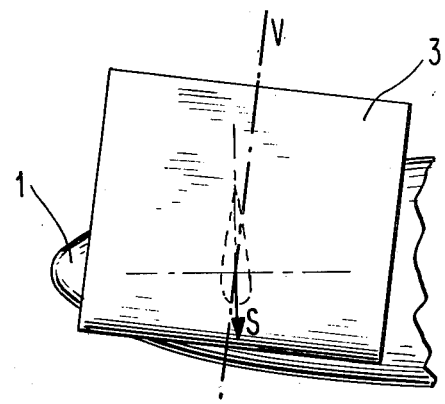
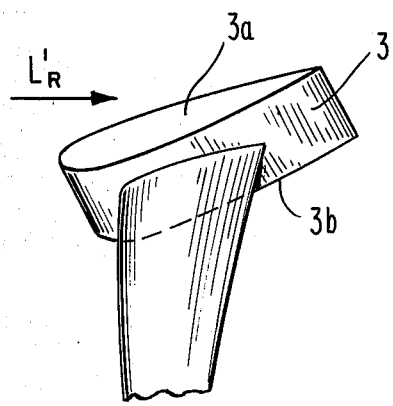
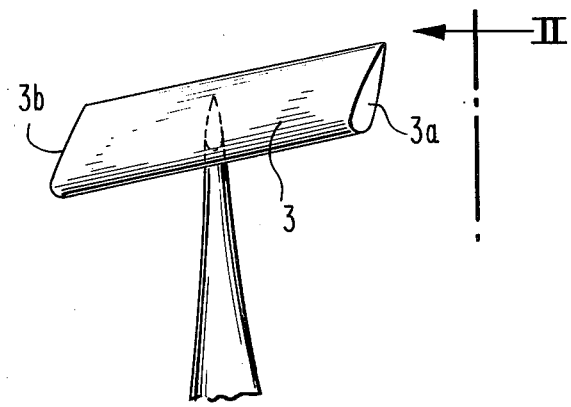
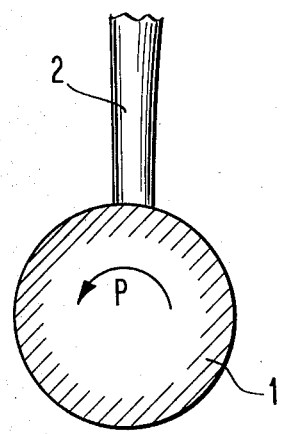
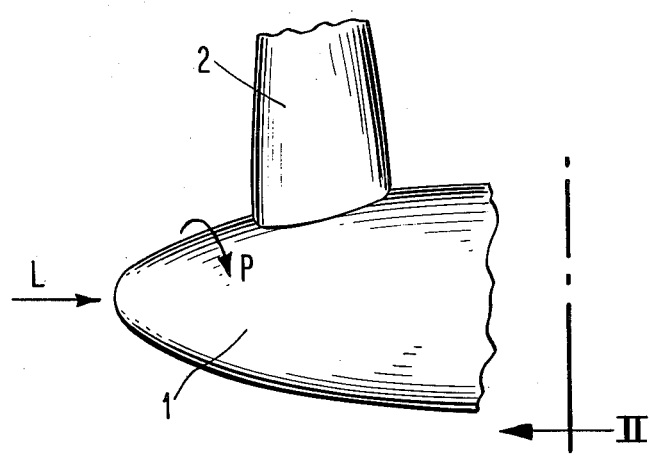
Fig. 3
Fig. 2
Fig. 1

PROPELLER OR A SET OF WINGS FOR A WIND MILL

The invention relates to a propellor or a set of wings for a wind mill or such a device, which can be driven by a flow of fluid, especially air, for deriving or absorbing energy from this flow of fluid such as the wind.

A propeller for a wind mill generally comprises a rotatable supported hub with mainly radially extending blades or wings connected to it. The blade angle of each blade varies along the length of the blade such that during the use of the propeller on each section of the blade a driving power is exerted in consequence of the relative direction of the flow of fluid or "relative wind" with reference to said section.

A blade for a propeller especially designed, however, for use as a ventilating fan is described in the U.S. Pat. No. 2,010,094, granted Aug. 6, 1935 to W. H. Leinweber. This blade is shaped as a flat plate and one surface of it is provided with a series of small fins extending transversely thereacross, the height of these fins increasing gradually from the leading edges of said blade to the trailing edge thereof. By means of these fins the flow conditions can be improved.

The British Pat. No. 15,096, granted Nov. 23, 1911 to C. A. Swenson, also describes a propeller with a blade shaped of a flat plate and provided with a series of small fins. In this patent it is remarked that such a propeller also can be used for a wind mill or such like.

Although wind mills are generally known the use of them was gradually decreasing in view of the fact that they only can supply energy when the weather conditions are favourably. For this reason other more reliable sources of energy were prefered. In view of the deminishing amount and the rising prices of these other sources of energy, it is again tried, however, to use the energy which is supplied by the wind.

When doing so use can be made of the of old known wind mill with the normal wing constructions, but the efficiency of such a mill can be considerably increased by using a propeller the blades of which are having a cross section in the shape of a "wing profile" such as used for propellers for airplanes having improved aerodynamic properties as compared with those of a curved flat plate.

To enable such a propeller to absorb an economical amount of energy a large propeller is needed, requiring an extensive support structure.

The primary object of the invention is to improve such a propeller further by increasing the amount of energy that can be absorbed or derived from the flow of fluid per unit of the propeller disc area.

According to the invention each of said blades or wings is provided with at least one auxiliary blade with a cross section in the shape of a wing profile which auxiliary blade, as seen in a sectional plane going through the midchord point of the average chord of said auxiliary blade and lying parallel to the plane defined by the relative wind with respect to said auxiliary blade and the centerline of the relating main blade, is positioned such that the elongation of the chord lying in said sectional plane and starting from said midchord point and going through the leading edge of said auxiliary blade will intersect a line positioned in said plane and running parallel to said relative wind and through the rotational axis of the hub of the propeller.

The "average chord" is considered as being the chord the angle of incidence of which is the average value of the angle of incidence of each chord along the length of said auxiliary blade. Said angle of incidence can vary along the length of the blade for obtaining better flow conditions.

By means of the above described auxiliary blade and the positioning thereof a force is exerted on said blade being directed to the hub of said propeller and thus an outwardly directed force is exerted on the flow of fluid. By this force a kind of "ventury effect" appears to be generated by which a part of the fluid, which normally should pass outside the propeller disc area is drawn into the propeller. It has appeared that in this way the amount of fluid supplying its energy to said propeller can be increased to at least twice its normal amount.

According to a prefered embodiment of the invention said auxiliary blade is tilted around the chord lying in the plane defined by the relative wind and the centerline of the relating main blade, such that the downstream end of the auxiliary blade is situated at a greater distance from the axis of rotation of the propeller than its upstream end. By this the induced drag of said auxiliary blade is reduced and said blade can absorb energy from the flow of fluid because it delivers a component of force in upstream direction.

According to a prefered embodiment of the propeller of the invention the auxiliary blade is mainly rectangular, the leading edge of it being positioned about normal to the relative direction of flow the leading and trailing edges being situated in one flat plane. By this the device according to the invention can be economical and easely constructed.

In view of the induced drag of the auxiliary blade this also can taper in plan form from the point where it is connected to the main blade. In such a case it can be prefered that the leading edge of the auxiliary blade is mainly situated behind a line extending through the foremost point of the leading edge and normal to the relative wind.

According to a further embodiment of the invention one end of the auxiliary blade can be connected to the end of the relating main blade, such that, generally speaking, an "angled" blade is obtained.

Further all these embodiments can be executed such that the leading and trailing edges are situated in a nonplanar plane, such that the auxiliary blade is twisted. It is clear that by doing so the construction of the blade will be more complicated ans so more expensive, but in certain cases the flow conditions can be further improved.

Concerning the relative direction of the flow of fluid or the "relative wind" with reference to the auxiliary blade it can be remarked that this, of course, depends on the circumferential speed of said blade, so on the number of revolutions of the propeller and also the wind velocity. It is prefered to design the total device such that the ratio between the velocity of said auxiliary blade and the absolute wind velocity is lying in the range of 8:1 up to 15:1. This being the case the direction of the relative velocity of the air, so of the relative wind will not considerably change and the efficiency of the device will hardly be effected by variations in the design parameters.

When the blades are long as compared with the length of the auxiliary blades it may be prefered to provide each blade with more than one auxiliary blade, said auxiliary blades being arranged at various distances from the centre of the hub of said propeller.

While the specification concludes with claims particularly pointing out and distinctly claiming the subject matter which is regarded as forming the present invention, it is believed that he invention will be better understood from the following description taken in connection with the accompaying drawings in which:

FIG. 1 is a diagrammatic side view of a device according to the present invention;

FIG. 2 is an end view along the line II—II of FIG. 1;

FIG. 3 is a plan view of the device of FIG. 1, together with a velocity diagram;

Figure 4:
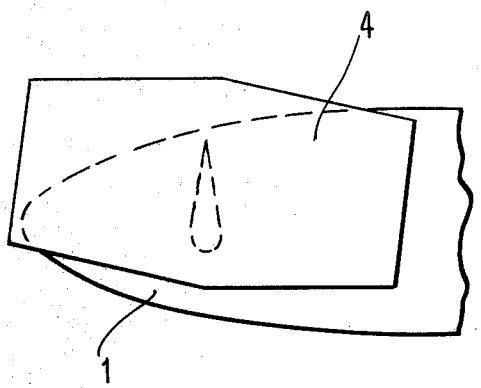
FIG. 4 is a plan view according to FIG. 3 but of another embodiment of the auxiliary blade.

The device as shown in the drawing comprises a hub 1 to which at least one propeller blade 2 is mounted. When air with a velocity L from the left as seen in FIG. 1 is flowing to the device the hub will be rotated in the direction of the arrow P. When the device rotates the tip of the blade 2 will have a velocity S, indicated in FIG. 3.

In case of the embodiment shown in the FIGS. 1-3 the tip of the blade 2 is provided with a rectangular auxiliary blade 3, the leading and trailing edges of which are positioned in a flat plane. In this case each chord of the auxiliary blade can be considered as being the "average chord". The circumferential velocity of the blade 3 will be about equal to S. The velocity of the air with respect to the auxiliary blade 3 and caused by the velocity S of this is indicated by $S_R$. The resulting relative wind with respect to the blade 3 is indicated by $L_R$. In view of the fact that $S_R$ will be a number of times as large as L the direction of $L_R$ will hardly vary when the ratio $S_R : L$ changes somewhat. In view of this the leading edge of the auxiliary blade 3 will nearly always be directed normal to the "relative wind" $L_R$.

From the FIGS. 1 and 2 it appears that the auxiliary blade 3 has such an angle of attack with reference to the relative wind, that the main component of the force working on it is directed to the center of the hub. It is true that FIG. 2 is showing an end view of the propeller of FIG. 1, but the plane in which this end view is lying makes only a very small angle with a plane V (FIG. 3) in which a chord of the auxiliary blade 3 and the axis of the main blade 2 are situated such that the plane V is running parallel to the relative wind. So the relative air velocity which is indicated by $L_R$ in FIG. 2 makes only a very small angle with the real relative air velocity.

As appears from the FIGS. 1 and 2 the auxiliary blade 3 is not directed normal to the plane V, but it is tilted with respect to its chord lying in this plane in such a way that its downstream end is situated at a greater distance from the longitudinal axis of the hub 1 than its upstream end. By this the already above indicated advantages are obtained.

FIG. 4 is showing an embodiment with which use is made of an auxiliary blade 4 shaped such that it tapers to both sides from its connection point with the main blade 2.

Figure 5:
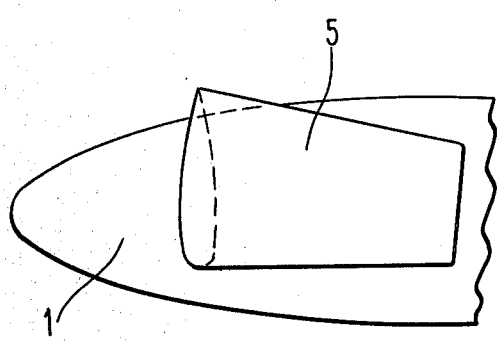
FIG. 5 is a plan view of still another embodiment.

FIG. 5 indicates the possibility that an auxiliary blade 5 only extends to one side of the main blade such that an "angled" blade is obtained.

Figure 6:
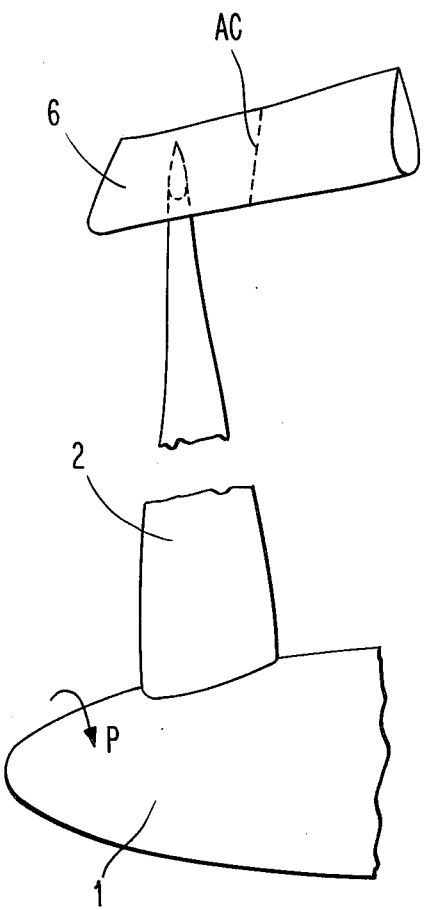
FIG. 6 is a side view according to FIG. 1 of a modified embodiment.

FIG. 6 shows a construction similar to that of FIG. 1. In this case, however, the "average chord" AC of the auxiliary blade 6 does not intersect the centerline of the main blade 2 and the leading and trailing edges of the auxiliary blade are situated in a non-planar plane such that the auxiliary blade is provided with a twist.

Figure 7:
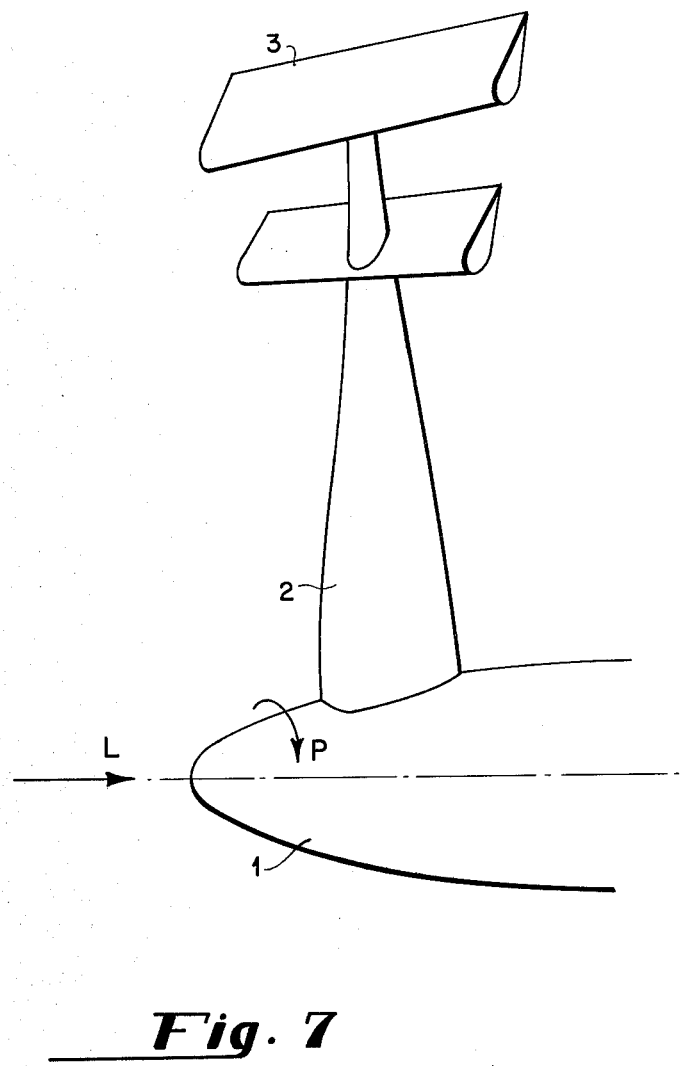
FIG. 7 is a side view according to FIG. 1 of another modified embodiment.

FIG. 7 shows a construction similar to that of FIG. 1. In this case, the main blade is provided with two or more auxiliary blades.

To avoid disadvantageous interference between the auxiliary and the main blade all embodiments can be provided with suitable fairings near the point of connection between these blades.

While particular embodiments of the invention have been illustrated and described, it will be obvious to those skilled in the art that various changes and modifications can be made without departing from the spirit and scope of the invention and it is intended to cover in the appended claims all such changes and modification that are within the scope of this invention.

What is claimed is:

1. A propeller or a set of wings for a wind mill or such a device for deriving or absorbing energy from a flow of fluid such as the wind, comprising a rotatable supported hub with at least one mainly radially extending blade having a cross section in the shape of a "wing profile" and a blade angle varying along the length of the blade, said blade being provided with at least one auxiliary blade with a cross section in the shape of a "wing profile", which auxiliary blade as seen in a sectional plane going through the midchord point of the average chord of said auxiliary blade and lying parallel to the plane, defined by the relative wind with respect to said auxiliary blade and the centerline of the relating main blade, is positioned such that the elongation of the chord lying in said sectional plane and starting from said midchord point and going through the leading edge of said auxiliary blade will interest a line positioned in said plane and running parallel to said relative wind and through the rotational axis of the hub of the propeller, wherein said auxiliary blade is mainly rectangular, the leading edge of it being positioned about normal to the relative direction of flow, the leading and trailing edges being situated in one flat plane.

2. A propeller according to claim 1 in which said auxiliary blade is tilted around the chord lying in the plane defined by the relative wind and the centerline of the relating main blade, such that the downstream end of the auxiliary blade is situated at a greater distance from the axis of rotation of the propeller than its upstream end.

3. A propeller according to claim 1, in which the auxiliary blade is mainly rectangular, the leading edge of it being positioned about normal to the relative direction of flow, the leading and trailing edges being situated in a non-planar plane such that the auxiliary blade is twisted.

4. A propeller according to claim 1 in which the auxiliary blade tapers in plan form from the point where it is connected to the main blade, the leading and trailing edges being situated in one flat plane.

5. A propeller according to claim 1, in which the auxiliary blade tapers in plan form from the point where it is connected to the main blade, the leading and trailing edges being situated in a non-planar plane such that the auxiliary blade is twisted.

6. A propeller according to claim 1 in which one end of the auxiliary blade is connected to the end of the relating main blade.

7. A propeller according to claim 1 in which said main blade is provided with two or more auxiliary blades.

* * * * *